A. E. SMITH.
Shaft and Journal.
No. 207,313. Patented Aug. 20, 1878.
Fig. 1.
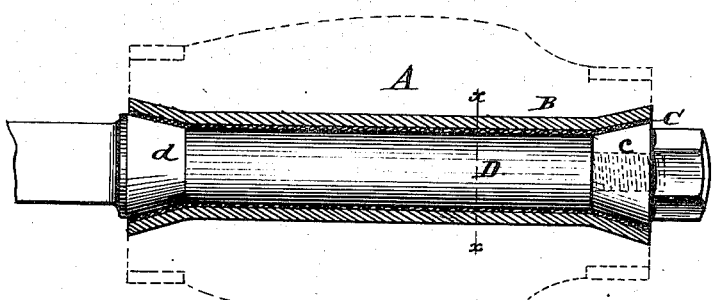
Fig. 2.
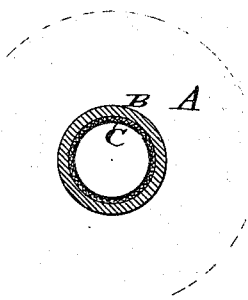
Fig. 3.
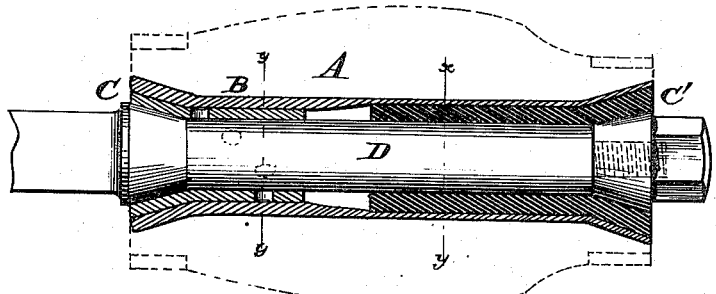
Fig. 4.
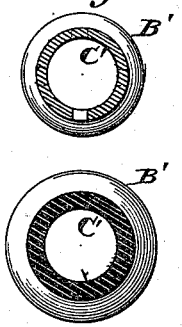
Fig. 5.
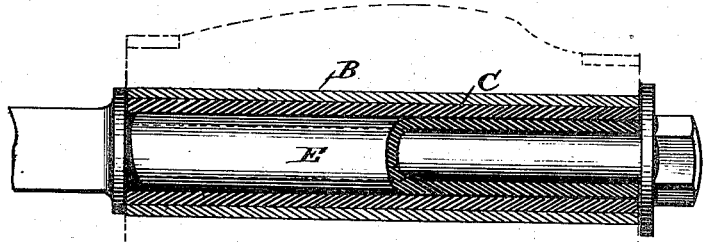
Fig. 6.
Fig. 7.
Fig. 8.
Fig. 9.
Attest
J. O. L. Perrine
Chas. L. Coombs.
Alfred E. Smith,
Inventor.
By James L. Norris,
Attorney.

BEST AVAILABLE COPY

UNITED STATES PATENT OFFICE.

ALFRED E. SMITH, OF BRONXVILLE, NEW YORK.

IMPROVEMENT IN SHAFTS AND JOURNALS.

Specification forming part of Letters Patent No. 207,313, dated August 20, 1878; application filed February 21, 1878.

*To all whom it may concern:*

Be it known that I, ALFRED E. SMITH, of Bronxville, in the county of Westchester and State of New York, have invented certain new and useful Improvements in Shafts and Journals, of which the following is a specification:

This invention relates to certain improvements in journal-bearings, its object being to give to the same a certain degree of elasticity in order to prevent the noise and disagreeable jarring attendant upon the rigid bearings commonly used, and at the same time to provide for the efficient lubrication of such bearings, as more fully hereinafter set forth.

To this end my invention consists in constructing either the bearing-surface of the axle, shaft, or journal, or the axle, shaft, or journal, or both, of elastic material, such as india-rubber, gutta-percha, or the like, and employing in conjunction with the same a dry lubricant, consisting of pulverized plumbago, which may be applied between the bearing-surfaces or incorporated with an interposed lining of fibrous material, or incorporated directly with the rubber or other elastic material, as may be found desirable in practice.

In the drawings, Figure 1 represents a longitudinal section of a journal and its bearing, showing my improvement; and Fig. 2, a transverse section of the bearing. Fig. 3 represents a longitudinal section of a journal and its bearing, showing a modification of my improvement; and Fig. 4, cross-sections of the bearing on the lines *x x* and *y y* of Fig. 3. Fig. 5 represents a longitudinal section of a journal and its bearing, showing the elastic lining applied to the journal as well as the bearing; Fig. 6, a view partly in elevation and partly in section, of a modification of the elastic lining for the bearing; Fig. 7, a view, partly in section and partly in elevation, showing the elastic lining provided with pockets or apertures for holding the dry lubricant; Fig. 8, a view, partly in section and partly in elevation, of the rigid lining employed in connection with the elastic lining of the bearing; and Fig. 9, a view showing my invention as applied to the journal-bearings of railroad-cars, shafting, and the like.

In carrying out my invention, I line the bearing-surfaces of either the box or the axle or shaft, or both, with india-rubber, gutta-percha, or other elastic material, inserting it as a bushing, or otherwise applying it to the box, or, in case of an ordinary vehicle, to the hub, and applying it as a sleeve to the axle or shaft, if said elastic bearing is to be employed thereon.

When the rubber bushing is employed as a lining for the hub or box, I preferably employ in connection therewith a lining of textile fabric, such as linen, to hold the dry lubricant employed with the improved elastic bearing.

In some instances it may be desirable to employ a rigid lining for the elastic bushing, which may consist of hard rubber, gutta-percha, or metal; but I prefer to employ a compound consisting of vulcanized rubber, having incorporated therewith pulverized plumbago, which can be readily manufactured by any person skilled in the art of manufacturing rubber; and such rigid lining may be provided with apertures at suitable points for the purpose of retaining the lubricant.

In connection with my improved journal-bearing, I employ a dry lubricant, consisting of pulverized plumbago or graphite, which may be applied directly to the bearing-surfaces, but is preferably applied by thoroughly incorporating it with a textile lining secured in the bushing, as above described.

In Figs. 1 and 2 of the drawings my improvement is represented as applied to the axle-bearings of a carriage or other ordinary vehicle, in which the letter A represents the hub of a vehicle, and B a bushing or lining of elastic material, preferably of india-rubber or gutta-percha.

The letter C represents a lining of textile fabric on the interior of the bushing or elastic lining, with which is thoroughly incorporated a sufficient quantity of pulverized plumbago to serve as a lubricant for the bearing.

The letter D represents the axle, which may be of the ordinary construction, but is preferably formed with a conical bearing, as shown at *d*, a similar conical bearing being formed on the nut *e*, which confines the hub to the axle. The yielding or elastic nature of the bushing enables it to conform to the shape of the conical bearings without being specially formed therefor.

In Figs. 3 and 4 is represented a hub provided with an elastic bushing, B, preferably of soft vulcanized rubber, with a lining of rigid material, C, which may consist of hard rubber, metal, or other suitable material, in which case the ends are formed to correspond with the conical bearings on the axle and nut, if such are employed.

In Figs. 4 and 5 the elastic lining is represented as applied to both the interior of the hub and the bearing-surface of the axle, the letter E representing a sleeve of elastic material, in the present instance consisting of vulcanized rubber. In this modification the elastic bushing is provided with a secondary bushing or lining of rigid material, such as metal or hard rubber, as represented at C, and a similar rigid bushing is shown in the modification represented in Figs. 3 and 4.

In Fig. 6 the rigid lining C is provided with a conical seat for the conical portion of the shaft, the elastic lining B being provided with a shoulder, $b$, at one end to limit the extent to which it is inserted in the hub or bearing.

In Fig. 7 the elastic lining B is represented having a series of pockets or apertures, $b'$, for the reception of the dry lubricant.

In Fig. 9 the elastic lining is represented as applied to the ordinary split journal-box G of a railroad-car, or the hangers of shafting, or the like.

It is evident that, as thus constructed, the journals or shafts will work in their bearings with comparatively little noise, and that such bearings will be particularly applicable to vehicles of all classes, as it will obviate, to a great extent, the jarring attendant upon the rigid bearings in use, causing the vehicle to ride much more easily and pleasantly.

What I claim, and desire to secure by Letters Patent, is—

The combination of a shaft or journal, its bearing, and an elastic bearing-surface with a dry lubricating-powder, such as plumbago or graphite, incorporated with or applied to the elastic bearing-surface, substantially as and for the purpose described.

In testimony that I claim the foregoing I have hereunto set my hand in the presence of the subscribing witnesses.

ALFRED E. SMITH.

Witnesses:
 HUGH PORTER,
 H. C. SCRIVER.